(12) United States Patent
Oshima et al.

(10) Patent No.: US 7,009,781 B2
(45) Date of Patent: Mar. 7, 2006

(54) ZOOM LENS MECHANISM PARTLY FOLDABLE AND RETRACTABLE

(75) Inventors: Atsushi Oshima, 1-23-5 Morigaoka, Isogo-Ku, Yokohama-shi, Kanagawa (JP) 235-0004; Akira Yamazaki, 3-11-17 Ryouke, Izumi-Ku, Yokohama-shi, Kanagawa (JP) 245-0004; Yasutaka Koga, 1-11-4 Honamanuma, Suginami-Ku, Tokyo (JP) 167-0031

(73) Assignees: ARC Design, Inc., Tokyo (JP); Atsushi Oshima, Yokohama (JP); Akira Yamazaki, Yokohama (JP); Yasutaka Koga, Tokyo (JP)

( * ) Notice: Subject to any disclaimer, the term of this patent is extended or adjusted under 35 U.S.C. 154(b) by 32 days.

(21) Appl. No.: 10/873,347

(22) Filed: Jun. 22, 2004

(65) Prior Publication Data

US 2005/0280903 A1 Dec. 22, 2005

(51) Int. Cl.
*G02B 15/14* (2006.01)

(52) U.S. Cl. ............... 359/697; 359/676; 359/683; 359/695; 359/696; 359/704; 359/823; 359/826; 396/55; 396/72; 396/529

(58) Field of Classification Search ............... 359/697, 359/676, 694, 695, 696, 703, 704, 817, 829, 359/557, 683, 689, 822, 823, 826, 828; 396/55, 396/72–75, 529
See application file for complete search history.

(56) References Cited

U.S. PATENT DOCUMENTS

| | | | | |
|---|---|---|---|---|
| 5,602,675 | A * | 2/1997 | Okada | 396/55 |
| 5,698,841 | A * | 12/1997 | Momoki | 396/55 |
| 5,907,724 | A * | 5/1999 | Uno et al. | 396/72 |
| 6,064,533 | A * | 5/2000 | Kenin et al. | 359/695 |
| 6,453,123 | B1 | 9/2002 | Oshima | |
| 6,762,888 | B1 * | 7/2004 | Oshima | 359/696 |
| 2004/0061949 | A1 * | 4/2004 | Yakita et al. | 359/697 |
| 2005/0007679 | A1 * | 1/2005 | Makii et al. | 359/694 |

* cited by examiner

*Primary Examiner*—Evelyn A. Lester
(74) *Attorney, Agent, or Firm*—Senniger Powers (57) ABSTRACT

A zoom lens mechanism foldable and retractable to be used in a digital still camera to control zooming of the zoom lens uses programmed data written in a micro controller unit (hereinafter referred to as MCU) instead of the conventional cylindrical grooved cams that are usually used to mechanically control zooming of a zoom lens of a digital still camera, and the assembly of the second lens group is rotatable inside the lens barrel, and the first lens group can be folded and retracted into the space provided by the rotation of the second lens assembly.

12 Claims, 4 Drawing Sheets

ZOOM LENS MECHANISM PARTLY FOLDABLE AND RETRACTABLE

BACKGROUND OF THE INVENTION

1. Field of the Invention

The invention relates to a mechanism that controls zooming of a zoom lens of digital still camera (hereinafter referred to as DSC) receiving electronic signals (pulses) from MCU, in which the programmed zooming data of the zoom lens is written, and also relates to a mechanism that enables a DSC to be very compact in total size by moving a part of zoom lens elements outward from the light path of the zoom lens to make a space into which the top group of lenses can be folded and retracted inward 2. Background Art In digital still cameras with a zoom lens, usually the zoom lens has a zooming mechanism controlled by conventional cylindrical grooved cams or a zooming mechanism operated by stepping motors being directly controlled by MCU of the DSC in which all the zooming data are programmed and installed.

The zoom lenses have a plurality of lens groups for zooming. From wide angle to telephoto, the lens groups must move correspondingly with each other. From one focal length position to another focal length position, the moving strokes of the lens groups are determined by the optical design of the lens. Usually the moving strokes of those lens groups are controlled mechanically by cylindrical grooved cams.

Figure 1:
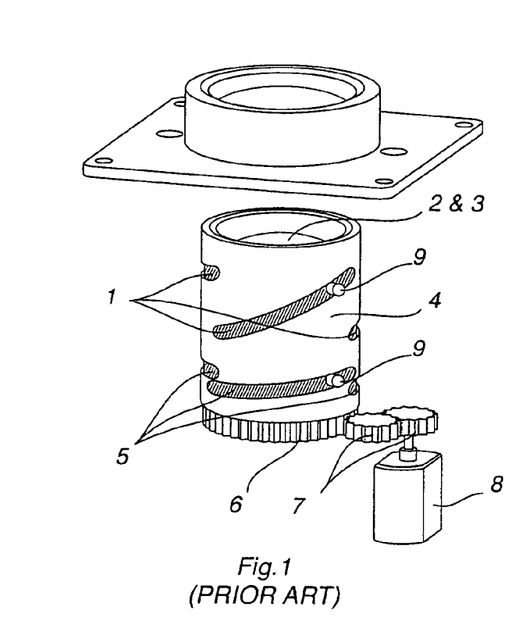
FIG. 1 is a perspective view of the conventional zooming control system by grooved cams.
Figure 1A:
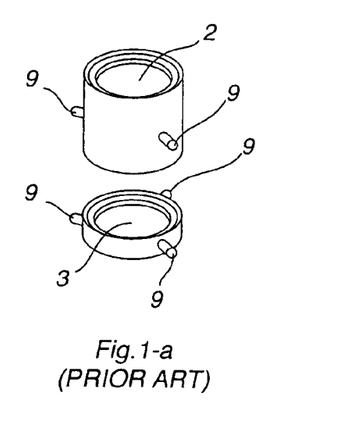

To enable the two groups of lenses to carry out the corresponding movements effectively, a mechanism with grooved cams is conventionally used. FIGS. 1 and 1-a show the conventional mechanical controlling system of zoom lens, which has six grooved cams. One group of lenses is controlled by one set of three grooved cams of the same curve and dimensions provided on the periphery of the outermost lens barrel (a tube to hold the whole lens assembly), and the other set of three grooved cams of the same curve and dimensions provided on the same periphery of the lens barrel controls the other group of lenses.

The first set of grooved cams (1) controls the second group of lenses (2) and the second set of grooved cams (5) controls the third group of lenses (3). At the bottom rim of the outermost lens barrel (4), the gear teeth (6) are provided and engaged with the driving gears (7) of the stepping motor (8). When the zooming switch is turned on, the stepping motor (8) starts rotating, and then the outermost lens barrel (4) starts rotating. While the outermost lens barrel (4) rotates, the grooved cams (1 & 5) move too, and the two groups of lenses (2 & 3) also move back and forth (up and down) through the movements of the cam followers (pins) (9) fixed on the lens barrel of each group of lenses and inserted into the slots of the grooved cams, which move according to the curves of the grooved cams (1 & 5). The curves of the grooved cams (1 & 5) are designed accurately according to the zooming data of the zoom lens. The direction of lens movement (back or forth) is determined by the direction of the rotation of the stepping motor.

In this kind of mechanical controlling of zooming, the accuracy of the grooved cams is highly required and it is very difficult to manufacture lens barrels with such accurate grooved cams, and consequently the cost of such accurate parts and components is quite expensive. The assembling and adjustment of the lens with such controlling mechanism are also quite difficult.

To solve the problems that the conventional cylindrical grooved cam zooming system has, an improved control system of zoom lens for DSCs has been disclosed in U.S. Pat. No. 6,453,123 issued to Arc Design, Inc., the same assignee of the subject application.

Figure 2:
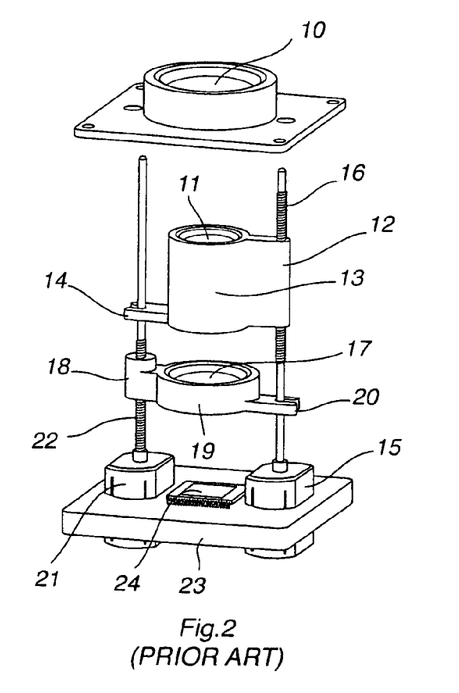
FIG. 2 is a perspective view of an example of the controls system of zoom lens for digital still cameras by stepping motors controlled by MCU.

In FIG. 2, the control system of zoom lens for DSCs comprises a first (front) group of lenses (10) fixed at the headmost position of the zoom lens assembly, a second group of lenses (11) which is placed next to the first group of lenses (10), a second lens barrel (13) in which the second group of lenses (11) is assembled, a first threaded bearing (12) formed as a part of the second lens barrel (13) of the second group of lenses (11), a first position stabilizing fork (14) which is formed on one side of the second lens barrel (13) of the second group of lenses (11) opposite to the first threaded bearing (12), a first stepping motor (15) with a first male screw rod (16) provided as an extension of the motor shaft, which is screwed into the bearing hole of the first threaded bearing (12) of the second group of lenses (11) and engages with the thread provided on the inner wall of the bearing hole of the first threaded bearing (12), a third group of lenses (17) which is placed next to the second group of lenses (11), a third lens barrel (19) in which the third group of lenses (17) is assembled, a second threaded bearing (18) formed as a part of the third lens barrel (19) of the third group of lenses (17), a second position stabilizing fork (20), which is formed on one side of the third lens barrel (19) of the third group of lenses (17) opposite to the second threaded bearing (18), and a second stepping motor (21) with a second screw rod (22) provided as an extension of the motor shaft, which is screwed into the bearing hole of the second threaded bearing (18) of the third group of lenses (17) and engages with the thread provided on the inner wall of the bearing hole of the second threaded bearing (18). All these component parts are assembled on an assembly base (23) on which an image sensor (24) like CCD or C-MOS is placed just underneath of the rearmost element of the lens assembly.

The instant that the power zooming switch of either telephoto or wide angle is turned on, the stepping motors (15 & 21) start moving simultaneously and the two groups of lenses (11 & 17) start moving to control zooming of the total lens in the telephoto direction or wide-angle direction receiving the zooming position signals of the zoom lens, which are programmed beforehand and written in the MCU of the DSC as the lens moving data to control each group of lenses for each focal length position.

Though the so far mentioned zooming control system could eliminate the conventional grooved cams which are expensive and difficult to make, it has still a shortcoming that due to the extended male screw shafts of stepping motors the total length or size of the zoom lens module becomes inevitably and relatively long.

The inventor of the subject application further develops a new mechanism of zoom lens module for DSCs that can shorten the length of the zoom lens module and minimize the total size of DSC itself and will be described in detail hereinafter.

SUMMARY OF THE INVENTION

In this invention, the grooved cams, which are used in conventional mechanism of zooming control, are eliminated. Instead of the grooved cams, the two lens groups are controlled by two stepping motors. One stepping motor drives the first group of lenses and the other stepping motor drives the second group of lenses. Or one stepping motor drives the second group of lenses and the other stepping motor drives the third group of lenses. The housing, in which the second group of lenses is assembled, is rotatable outward around on an axis provided with the housing at a 90 degree angle making way for the first lens group so that the first group of lenses can be retracted and placed in the space made by the right-angled rotation of the housing of second group of lenses.

The first lens group is located at the headmost position of the lens module and assembled in a lens holder with a stepping motor and a threaded bearing is provided on the side of the first lens holder. The (first) stepping motor which drives the first lens holder has an extended male screw shaft, which engages with the female screw-thread provided in the inner wall of the threaded bearing. Or the first lens group is located at the headmost position of the lens module and assembled in a lens holder and the lens holder does not move. All the components of the first lens group are assembled in a first outer lens barrel.

The second lens group is located next to the first lens group and also assembled in a lens holder with a stepping motor, and a threaded bearing is provided on the side of the second lens holder. The second stepping motor which drives the second lens holder has an extended male screw shaft, which engages with the female screw-thread provided in the inner wall of the threaded bearing provided on the second lens holder. All the components of the second lens group are accommodated in a second lens housing and the second lens holder is placed on a module base and covered by a second outer lens barrel.

The third lens group or the third lens is located at the rearmost position of the lens module and assembled in a lens holder and the lens holder does not move. Or the third lens group or the third lens is assembled in a lens holder with a stepping motor, and a threaded bearing is provided on the side of the third lens holder. The third stepping motor which drives the third lens holder has an extended male screw shaft, which engages with the female screw-thread provided in the inner wall of the threaded bearing. All the components of the third lens group are assembled on the module base and accommodated in the third outer lens barrel.

Figure 3:
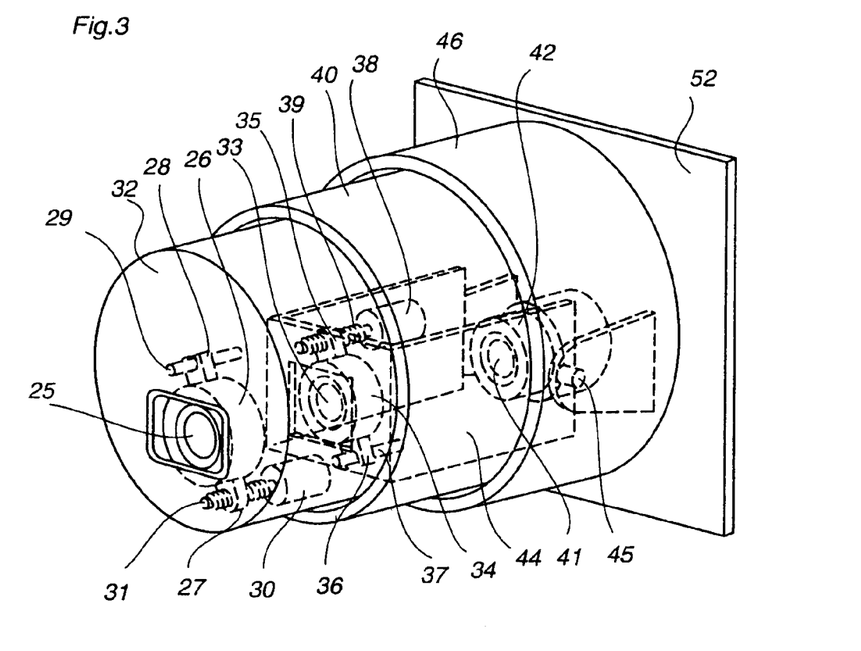
FIG. 3 is a perspective view of the first embodiment of the present invention in the fully extended status.
Figure 4:
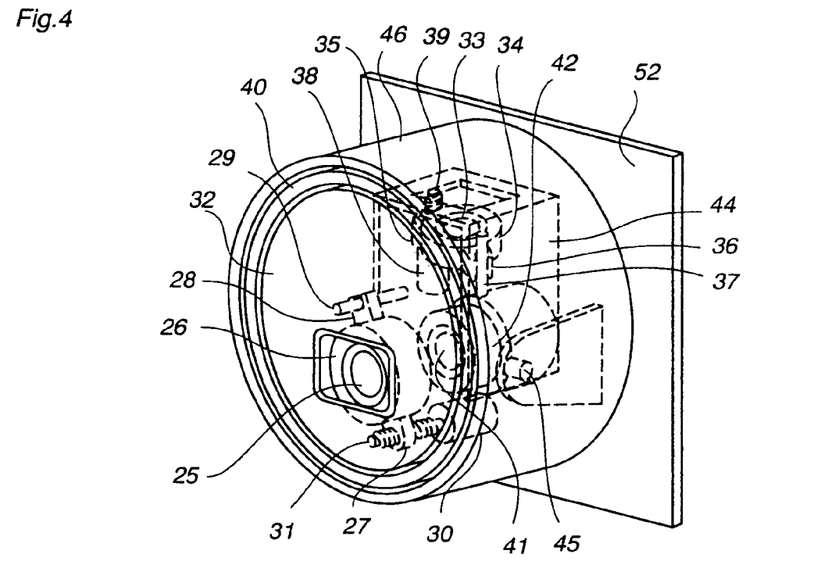
FIG. 4 is a perspective view of the first embodiment of the present invention in the fully folded and retracted status.

When the lens module is in picture taking (image capturing) position (the status of FIGS. 3 and 5), those lens holders are on the optical axis in a line, but when it is to be folded and retracted into the camera body, the second lens housing together with the second lens holder and the second stepping motor is turned around on the housing-axis at a 90 degree angle outward from the optical axis, and gives a space for the first lens holder to be retracted.

Into the space given by the second lens housing rotation, the first outer lens barrel of the first lens holder with the first stepping motor and the second outer lens barrel can be retracted so that the total thickness of the lens module can be decreased, and consequently the DSC itself can be minimized in size (thickness).

In the case of this invention, instead of having grooved cams to mechanically control zooming of the lens, the lens moving data that controls each group of lenses for each focal length position must be programmed as electronic position signal data and written in a MCU of DSC. The instant that the power zooming switch of either telephoto or wide angle is turned on, the stepping motors start moving simultaneously and the lens groups start moving to control zooming of the total lens in telephoto direction or wide-angle direction receiving signals from the MCU according to the designed lens moving tracks.

When the zoom lens is not in use, it is preferable to retract the zoom lens into the camera body as compactly as possible. It is therefore a main and important object of this invention to provide a mechanism to fold and put aside the second group of lens out of the optical axis and path, and to retract the first group of lens and its accessories into the space which is provided by moving the second lens group out of the light path.

The present invention uses two stepping motors and the mechanical grooved cams that require extreme accuracy in manufacturing are eliminated. Further more by rotating the housing of second group of lenses with its stepping motor at a 90 degree angle outward from the optical axis and path, the first lens group can be retracted deeply into the camera body helping greatly for the DSC to be very compact and thin.

BRIEF DESCRIPTION OF DRAWINGS

FIG. 1-a is a perspective view of the two lens groups assembled in each lens barrel, which are placed in the conventional zooming control system with grooved cams.

DETAILED DESCRIPTION OF THE INVENTION

Figure 5:
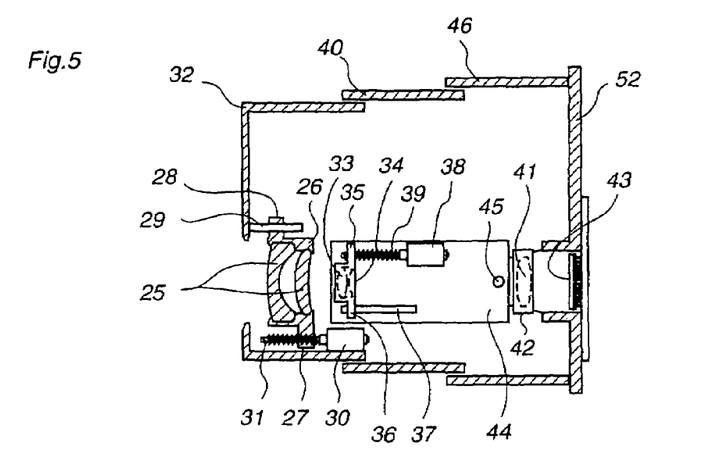
FIG. 5 is a side and partly cross sectional view of the first embodiment of the present invention in the fully extended status.
Figure 6:
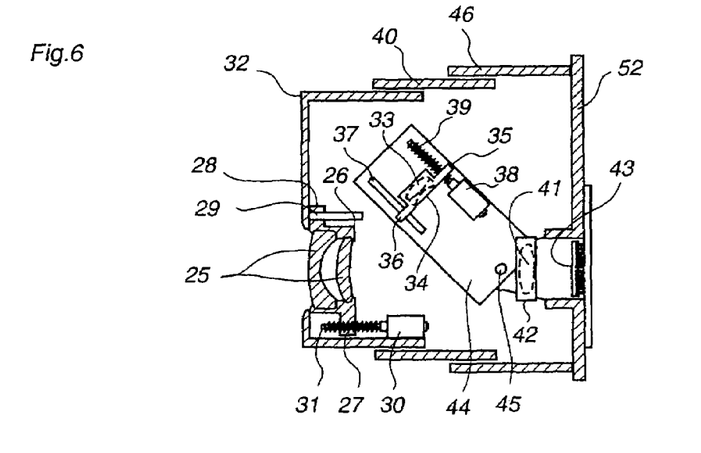
FIG. 6 is a side and partly cross sectional view of the first embodiment of the present invention in the status being folded halfway.
Figure 7:
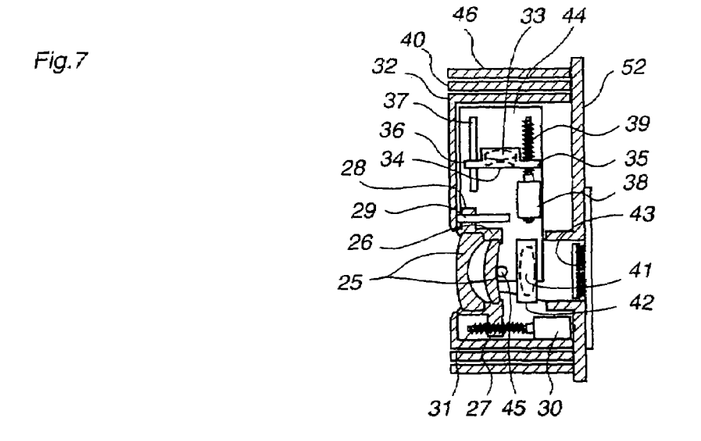
FIG. 7 is a side and partly cross sectional view of the first embodiment of the present invention in the fully folded and retracted status.

FIGS. 5, 6 and 7 show a first preferred embodiment of this invention, namely a zoom lens mechanism partly foldable and retractable.

In the optical design of this embodiment, there are three lens groups. The first group of lenses is placed at the front (headmost) position and the second lens group of lenses is placed next to the first group of lenses, and the third group of lenses is placed at the rearmost position. These three groups of lenses are all accommodated in three outer lens barrels, which are foldable compactly when not in use and extendable when in use. To control zooming of the first and second lens groups should move at a time correspondingly with each other, and the third lens is fixed at the rearmost position of the lens module not to move.

This embodiment of the present invention comprises a first (front) group of lenses (25) positioned at the headmost position of the zoom lens assembly; a first lens holder (26)

in which the first group of lenses is assembled; a first threaded bearing (27) formed as a part of the first lens holder (26) of the first group of lenses (25); a first means of position stabilizing, which is comprised of two parts, namely a first position stabilizing member (28) formed on one side of the first lens holder (26) of the first group of lenses (25) apart from the first threaded bearing (27) and a first supporting rod (29) with which the first position stabilizing member (28) is engaged to stabilize the first lens holder (26); a first stepping motor (30) with a first male screw shaft (31) provided as an extension of the motor shaft, which is screwed into the bearing hole of the first threaded bearing (27) of the first lens holder (26) and engages with the female screw thread provided on the inner wall of the bearing hole of the first threaded bearing (27); a first outer lens barrel (32) in which the first lens holder (26) and all the accessories belonging to the first lens group mechanism are accommodated; a second group of lenses (33) which is placed next to the first group of lenses (25); a second lens holder (34) in which the second group of lenses (33) is assembled; a second threaded bearing (35) formed as a part of the second lens holder (34) of the second group of lenses (33); a second means of position stabilizing, which is comprised of two parts, namely a second position stabilizing member (36) formed on one side of the second lens holder (34) of the second group of lenses (33) apart from the second threaded bearing (35) and a second supporting rod (37) with which the second position stabilizing member (36) is engaged to stabilize the second lens holder (34), a second stepping motor (38) with a second male screw shaft (39) provided as an extension of the motor shaft, which is screwed into the bearing hole of the second threaded bearing of the second lens holder (34) and engages with the female screw thread provided on the inner wall of the bearing hole of the second threaded bearing (35); a second lens housing (44) in which the second lens holder (34) and all the accessories belonging to the second lens group mechanism are accommodated, a second outer lens barrel which covers the second lens housing; a third group of lenses (41) or a third lens (41) which is fixed next to the second group of lenses (33); a third lens holder (42) in which the third group of lenses (41); a third outer lens barrel (46) in which the third lens holder (42) is accommodated with an image sensor (43) like CCD or C-MOS placed just underneath the third lens or lens group; and a module base (52) on which all the lenses, components and parts are built.

The first group of lenses (25) is assembled in the first lens holder (26), and the first lens holder (26) is supported by the first male screw shaft (31) extending from the shaft of the first stepping motor (30) which is screwed into the hole of first threaded bearing (27) formed as a part of the first lens holder (26) and engages with the inner female thread of the first threaded bearing (27). The first lens holder (26) is also supported by the first position stabilizing member (28), which is formed on and as a part of the first lens holder (26) of the first group of lenses (25) apart from the first threaded bearing (27) and is engaged with the first supporting rod (29) that is provided aside the first lens holder, so that the first lens holder (26) cannot rotate. Thus keeping the first position stabilizing member (28) engaged with the first supporting rod (29), the first lens holder (26) can be moved back and forth (up and down) along the first male screw shaft (31) and the first supporting rod (29) as the first male screw shaft (31) rotates. All the components of the first lens group, namely the first lens holder (26) with the first threaded bearing (27) and the first position stabilizing member (28), the first stepping motor (30) and the first supporting rod (29) are accommodated in the first outer lens barrel (32) that can be retracted into the camera body as a whole.

The second group of lenses (33) is assembled in the second lens holder (34), and the second lens holder (34) is supported by the second male screw shaft (39) extending from the shaft of the second stepping motor (38) which is screwed into the hole of second threaded bearing (35) formed as a part of the second lens holder (34) and engages with the inner female thread of the second threaded bearing (35). The second lens holder (34) is also supported by the second position stabilizing member (36), which is formed on and as a part of the second lens holder (34) of the second group of lenses (33) apart from the second threaded bearing (35) and is engaged with the second supporting rod (37) that is provided aside the second lens holder (34), so that the second lens holder (34) cannot rotate. Thus keeping the second position stabilizing member (36) engaged with the second supporting rod (37), the second lens holder (34) can be moved back and forth (up and down) along the second male screw shaft (39) and the second supporting rod (37) as the second male screw shaft (39) rotates. All the components of the second lens group, namely the second lens holder (34) with the second threaded bearing (35) and the second position stabilizing member (36), the second stepping motor (38) and the second supporting rod (37) are accommodated in the second lens housing (44). The second lens housing (44) as a whole is built on the module base (52) and covered by the second and third lens barrels (40 & 46).

A housing-axis (45) is provided on the side of the second lens housing (44). The second lens housing (44) can be turned around on the housing-axis (45) at a 90 degree angle outward from the optical axis and path, and that rotation of the second lens housing (44) gives a space for both the first outer lens barrel (32) and the second outer lens barrel (40) to be retracted together with all the components of the first lens group as a whole into the third outer lens barrel (46) and the camera body.

The third group of lenses (41) is assembled in the third lens holder (42), and the third lens holder (26) is fixed not to move at the rearmost position of the whole lens assembly on the module base (52).

When the zoom lens is in the status of picture taking (image capturing), the instant that the power zooming switch of either telephoto or wide angle is turned on, the first and second stepping motors (30 & 38) start moving simultaneously and the first and second groups of lenses (25 & 33) start moving to control zooming of the total lens in telephoto direction or wide-angle direction receiving the zooming position signals of the zoom lens, which are to be programmed beforehand and written in the MCU of the DSC as the lens moving data to control each group of lenses for each focal length position.

While either of the telephoto switch or wide-angle switch is on, the MCU keeps sending signals to each of the first and second stepping motors (30 & 38) to move the first and second groups of lenses (25 & 33) from a point to another, and when the switch is turned off, the movements of the two groups of lenses (25 & 33) stop there instantly.

Figure 9:
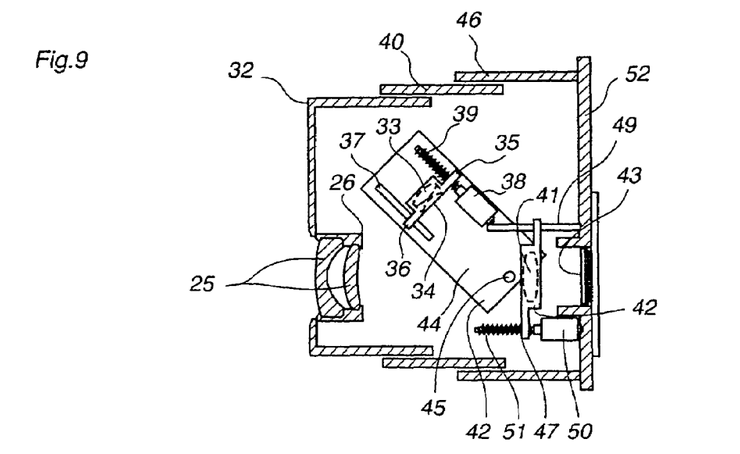
FIG. 9 is a side and partly cross sectional view of the second embodiment of the present invention in the status being folded halfway.

When the zoom lens is not in use, the second lens housing (44) is turned around on the housing-axle (45) at a 90 degree angle. And into the space which is provided by the rotation of the whole second lens housing (44) outward from the lens optical path, the first outer lens barrel (32) can be retracted together with the second outer lens barrel (40) and stored there as a whole, so that the first lens group (25) and the second lens group (33) are almost on the same level horizontally as shown by FIG. 9. Thus the total lens module size can be much thinner than that of the zoom lens module in which all the lens groups (25, 33 & 41) are placed vertically as a line on the optical axis.

As theretofore explained, the known grooved cams for zooming control that require very high accuracy in manufacturing are not used in this invention. Instead, only two stepping motors (30 & 38) control the zooming in this invention. Furthermore, by moving the second lens housing (44) outward from the lens optical axis and path, the first lens group (25) and its first outer lens barrel (32) can be retracted deeply into the camera body making the total camera body size as compact as possible.

Figure 8:
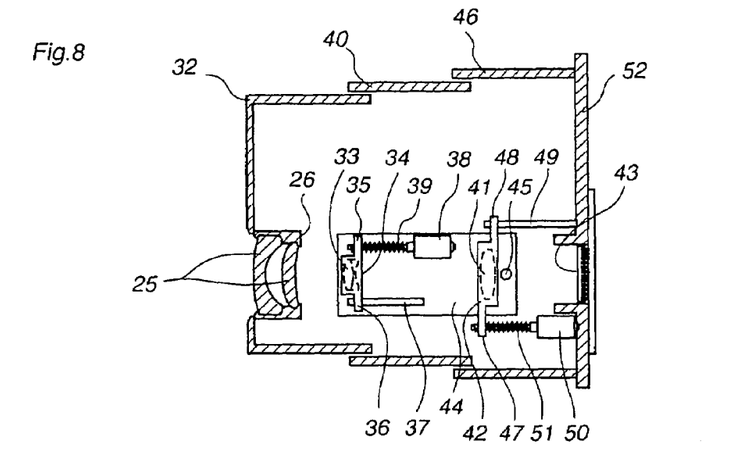
FIG. 8 is a side and partly cross sectional view of the second embodiment of the present invention in the fully extended status.
Figure 10:
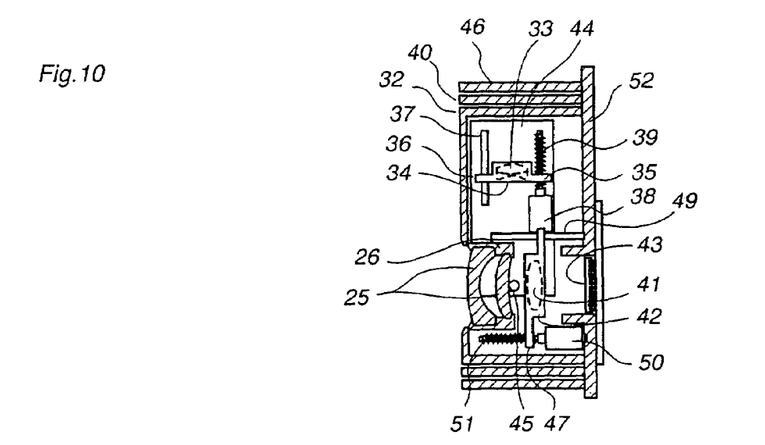
FIG. 10 is a side and partly cross sectional view of the second embodiment of the present invention in the fully folded and retracted status.

FIGS. 8, 9 and 10 show another preferred embodiment of this invention.

In the optical design of this embodiment, there are three lens groups. The first group of lenses is placed at the front (headmost) position and the second lens group of lenses is placed next to the first group of lenses, and the third group of lenses is placed at the rearmost position. These three groups of lenses are all accommodated in three outer lens barrels, which are foldable compactly when not in use and extendable when in use. To control zooming of the second and the third lens groups should move at a time correspondingly with each other, and the first lens group is fixed at the headmost position of the lens module not to move.

The second embodiment of the present invention comprises a first (front) group of lenses (25) positioned at the headmost position of the zoom lens assembly; a first lens holder (26) in which the first group of lenses is assembled; a first outer lens barrel (32) in which the first lens holder (26) is accommodated; a second group of lenses (33) which is placed next to the first group of lenses (25); a second lens holder (34) in which the second group of lenses (33); a second threaded bearing (35) formed as a part of the second lens holder (34) of the second group of lenses (33); a second means of position stabilizing, which is comprised of two parts, namely a second position stabilizing member (36) formed on one side of the second lens holder (34) of the second group of lenses (33) apart from the second threaded bearing (35) and a second supporting rod (37) with which the second position stabilizing member (36) is engaged to stabilize the second lens holder (34); a second stepping motor (38) with a second male screw shaft (39) provided as an extension of the motor shaft, which is screwed into the bearing hole of the second threaded bearing of the second lens holder (34) and engages with the female screw thread provided on the inner wall of the bearing hole of the second threaded bearing (35); a second lens housing (44) in which the second lens holder (34) and all the accessories belonging to the second lens group mechanism are accommodated; a second outer lens barrel (40) which covers the second lens housing(44); a third group of lenses (41) or a third lens (41) which is placed next to the second group of lenses (33); a third lens holder (42) in which the third group of lenses (41) is assembled; a third threaded bearing (47) formed as a part of the third lens holder (42) of the third group of lenses (41); a third means of position stabilizing, which is comprised of two parts, namely a third position stabilizing member (48) formed on one side of the third lens holder (42) of the third group of lenses (41) apart from the third threaded bearing (47) and a third supporting rod (49) with which the third position stabilizing member (48) is engaged to stabilize the third lens holder (42); a third stepping motor (50) with a third male screw shaft (51) provided as an extension of the motor shaft, which is screwed into the bearing hole of the third threaded bearing (47) of the third lens holder (42) and engages with the female screw thread provided on the inner wall of the bearing hole of the third threaded bearing (47); a third outer lens barrel (46) in which the third lens holder (42) and all the accessories belonging to the third lens group mechanism are accommodated with an image sensor (43) like CCD or C-MOS placed just underneath the third lens group or the third lens; and a module base (52) on which all the lenses, components and part are built.

The first group of lenses (25) is assembled in the first lens holder (26), and the first lens holder (26) is fixed with the first outer lens barrel (32) at the headmost position of the whole lens assembly on the module base (52).

The second group of lenses (33) is assembled in the second lens holder (34), and the second lens holder (34) is supported by the second male screw shaft (39) extending from the shaft of the second stepping motor (38) which is screwed into the hole of second threaded bearing (35) formed as a part of the second lens holder (34) and engages with the inner female thread of the second threaded bearing (35). The second lens holder (34) is also supported by the second position stabilizing member (36), which is formed on and as a part of the second lens holder (34) of the second group of lenses (33) apart from the second threaded bearing (35) and is engaged with the second supporting rod (37) that is provided aside the second lens holder (34), so that the second lens holder (34) cannot rotate. Thus keeping the second position stabilizing member (36) engaged with the second supporting rod (37), the second lens holder (34) can be moved back and forth (up and down) along the second male screw shaft (39) and the second supporting rod (37) as the second male screw shaft (39) rotates. All the components of the second lens group, namely the second lens holder (34) with the second threaded bearing (35) and the second position stabilizing member (36), the second stepping motor (38) and the second supporting rod (37) are accommodated in the second lens housing (44). The second lens housing (44) as a whole is built on the module base (52), and covered by the second and third outer lens barrels (40 & 46).

A housing-axis (45) is provided on the side of the second lens housing (44). The second lens housing (44) can be turned around on the housing-axis (45) at a 90 degree angle outward from the optical axis and path, and that rotation of the second lens housing (44) gives a space for both the first outer lens barrel (32) and the second outer lens barrel (40) to be retracted together with all the components of the first lens group as a whole into the third outer lens barrel (46) and the camera body.

The third group of lenses (41) is assembled in the third lens holder (42), and the third lens holder (42) is supported by the third male screw shaft (51) extending from the shaft of the third stepping motor (50) which is screwed into the hole of third threaded bearing (47) formed as a part of the third lens holder (42) and engages with the inner female thread of the third threaded bearing (47). The third lens holder (42) is also supported by the third position stabilizing member (48), which is formed on and as a part of the third lens holder (42) of the third group of lenses (41) apart from the third threaded bearing (47) and is engaged with the third supporting rod (49) that is provided aside the third lens holder, so that the third lens holder (42) cannot rotate. Thus keeping the third position stabilizing member (48) engaged with the third supporting rod (49), the third lens holder (42) can be moved back and forth (up and down) along the third male screw shaft (51) and the third supporting rod (49) as the third male screw shaft (51) rotates. All the components of the third lens group, namely the third lens holder (42) with the third threaded bearing (47) and the third position stabilizing member (48), the third stepping motor (50) and the third supporting rod (49) are accommodated in the third outer lens barrel (46). The third lens holder (42) with its components as a whole is built on the module base (52), and covered by the third lens barrel (46).

When the zoom lens is in the status of picture taking (image capturing), the instant that the power zooming switch of either telephoto or wide angle is turned on, the second and third stepping motors (38 & 50) start moving simultaneously and the second and third groups of lenses (33 & 41) start moving to control zooming of the total lens in telephoto direction or wide-angle direction receiving the zooming position signals of the zoom lens, which are to be programmed beforehand and written in the MCU of the DSC as the lens moving data to control each group of lenses for each focal length position.

While either of the telephoto switch or wide-angle switch is on, the MCU keeps sending signals to each of the second and third stepping motors (38 & 50) to move the second and third groups of lenses (33 & 41) from a point to another, and when the switch is turned off, the movements of the two groups of lenses (33 & 41) stop there instantly.

When the zoom lens is not in use, the second lens housing (44) is turned around on the housing-axle (45) at a 90-degree angle. And into the space which is provided by the rotation of the whole second lens housing (44) outward from the lens optical path, the first outer lens barrel (32) can be retracted together with the second outer lens barrel (40) and stored there as a whole, so that the first lens group (25) and the second lens group (33) are almost on the same level horizontally as shown by FIG. 10. Thus the total lens module size can be much thinner than that of the zoom lens module in which all the lens groups (25, 33 & 41) are placed vertically as a line on the optical axis.

As theretofore explained, the known grooved cams for zooming control that require very high accuracy in manufacturing are not used in this invention. Instead, only two stepping motors (38 & 50) control the zooming in this invention. Furthermore, by moving the second lens housing (44) outward from the lens optical axis and path, the first lens group (25) and its first outer lens barrel (32) can be retracted deeply into the camera body making the total camera body size as compact as possible.

While embodiments of the present invention are illustrated and described, various modifications and improvements can be made by persons skilled in the art. The embodiments of the present invention are therefore described in an illustrative but not restrictive sense. It is intended that the present invention may not be limited to the particular forms as illustrated, and that all modifications which maintain the spirit and realm of the present invention are within the scope as defined in the appended claims.

What is claimed is:

1. A zoom lens mechanism partly foldable and retractable for a digital still camera which controls zooming of the zoom lens using programmed data written in a micro controller unit of the digital still camera comprising:
   a) an assembly base on which said control system of zoom lens for the digital still camera is assembled;
   b) a first group of lenses, which is assembled in a first lens holder and placed at the headmost position of said assembly base;
   c) a first threaded bearing which is formed as a part of said first lens holder of said first group of lenses or as a separate part to be fixed on said first lens holder of said first group of lenses;
   d) a first means of position stabilizing for said first lens holder not to rotate;
   e) a first stepping motor to drive said first lens holder;
   f) a first screw rod which is provided on and connected to a shaft of said first stepping motor as an extension of the motor shaft and is screwed into a bearing hole of said first threaded bearing of said first lens holder of said first group of lenses and engages with threads provided on an inner wall of said first threaded bearing of said first lens holder of said second group of lenses;
   g) a second group of lenses, which is assembled in a second lens holder and placed next to said first group of lenses;
   h) a second threaded bearing which is formed as a part of said second lens holder of said second group of lenses or as a separate part to be fixed on said second lens holder of said second group of lenses;
   i) a second means of position stabilizing for said second lens holder not to rotate;
   j) a second stepping motor to drive said second lens holder;
   k) a second screw rod which is provided on and connected to a shaft of said second stepping motor as an extension of the motor shaft and is screwed into a bearing hole of said second threaded bearing of said second lens holder of said second group of lenses and engages with threads provided on an inner wall of said second threaded bearing of said second lens holder of said second group of lenses;
   l) a second lens housing in which said second lens holder, said second stepping motor, said second means for position stabilizing are accommodated;
   m) an axle provided on the side of said second lens holder, around on which said second housing can be rotated outward from the optical axis and path of the zoom lens at a 90 degree angle at least;
   n) a third group of lenses, which is assembled in a third lens holder and placed next to said second group of lenses and fixed there not to move; and
   o) a foldable outer lens barrel with 3 folding steps, in which all said lens groups, said stepping motors, said position stabilizing means and other related mechanisms built on said assembly base are accommodated.

2. A zoom lens mechanism partly foldable and retractable as claimed in claim 1, wherein while said first lens holder is moving back and forth, said first lens holder is supported and stabilized by said first screw rod engaged with said first threaded bearing and said first means of position stabilizing for said first lens holder not to rotate.

3. A zoom lens mechanism partly foldable and retractable as claimed in claim 1, wherein while said second lens holder is moving back and forth, said second lens holder is supported and stabilized by said second screw rod engaged with said second threaded bearing and said second means of position stabilizing for said second lens holder not to rotate.

4. A zoom lens mechanism partly foldable and retractable as claimed in claim 1, wherein said first lens holder, in which said first group of lenses are assembled, is connected to said first screw rod of said first stepping motor through said first threaded bearing so that said first lens holder moves back and forth (up and down) when said first stepping motor is rotating after receiving the data-signals of zooming of the zoom lens which is pre-programmed and written in the micro controller unit of the digital still camera.

5. A zoom lens mechanism partly foldable and retractable as claimed in claim 1, wherein said second lens holder, in which said second group of lenses are assembled, is connected to said second screw rod of said second stepping motor through said second thread bearing so that said second lens holder moves back and forth (up and down) when said second stepping motor is rotating after receiving the data-signals of zooming of the zoom lens which is pre-programmed and written in the micro controller unit of the digital still camera.

6. A control system of zoom lens for a digital still camera as claimed in claim 1, wherein after said second lens housing has been rotated outward from the optical axis and path around on said axle, both the first step section of said foldable outer lens barrel with 3 folding steps, in which said first lens holder is fixed, and the second step section of said foldable outer lens barrel can be folded and retracted into the space which was provided inside the third step section of said foldable outer lens barrel by the rotation of said second lens housing.

7. A zoom lens mechanism partly foldable and retractable for a digital still camera which controls zooming of the zoom lens using programmed data written in the micro controller unit of the digital still camera comprising:
   p) an assembly base on which said control system of zoom lens for the digital still camera is assembled;
   q) a first group of lenses, which is assembled in a first lens holder and placed at the headmost position of said assembly base and fixed there not to move;
   r) a second group of lenses, which is assembled in a second lens holder and placed next to said first group of lenses;
   s) a second threaded bearing which is formed as a part of said second lens holder of said second group of lenses or as a separate part to be fixed on said second lens holder of said second group of lenses;
   t) a second means of position stabilizing for said second lens holder not to rotate;
   u) a second stepping motor to drive said second lens holder;
   v) a second screw rod which is provided on and connected to a shaft of said second stepping motor as an extension of the motor shaft and is screwed into a bearing hole of said second threaded bearing of said second lens holder of said second group of lenses and engages with threads provided on an inner wall of said second threaded bearing of said second lens holder of said second group of lenses;
   w) a second lens housing in which said second lens holder, said second stepping motor, said second means for position stabilizing are accommodated;
   x) an axle provided on the side of said second lens holder, around on which said second housing can be rotated outward from the optical axis and path of the zoom lens at a 90 degree angle at least;
   y) a third group of lenses, which is assembled in a third lens holder and placed at the rearmost position of said assembly base;
   z) a third threaded bearing which is formed as a part of said third lens holder of said third group of lenses or as a separate part to be fixed on said third lens holder of said third group of lenses;
   aa) a third means of position stabilizing for said third lens holder not to rotate;
   bb) a third stepping motor to drive said third lens holder;
   cc) a third screw rod which is provided on and connected to a shaft of said third stepping motor as an extension of the motor shaft and is screwed into a bearing hole of said third threaded bearing of said third lens holder of said third group of lenses and engages with threads provided on an inner wall of said third threaded bearing of said third lens holder of said second group of lenses;
   dd) a foldable outer lens barrel with 3 folding steps, in which all said lens groups, said stepping motors, said position stabilizing means and other related mechanisms built on said assembly base are accommodated.

8. A zoom lens mechanism partly foldable and retractable as claimed in claim 7, wherein while said second lens holder is moving back and forth, said second lens holder is supported and stabilized by said second screw rod engaged with said second threaded bearing and said second means of position stabilizing for said second lens holder not to rotate.

9. A zoom lens mechanism partly foldable and retractable as claimed in claim 7, wherein while said third lens holder is moving back and forth, said third lens holder is supported and stabilized by said third screw rod engaged with said third threaded bearing and said third means of position stabilizing for said third lens holder not to rotate.

10. A zoom lens mechanism partly foldable and retractable as claimed in claim 7, wherein said second lens holder, in which said second group of lenses are assembled, is connected to said second screw rod of said second stepping motor through said second thread bearing so that said second lens holder moves back and forth (up and down) when said second stepping motor is rotating after receiving the data-signals of zooming of the zoom lens which is pre-programmed and written in the micro controller unit of the digital still camera.

11. A zoom lens mechanism partly foldable and retractable as claimed in claim 7, wherein said third lens holder, in which said third group of lenses are assembled, is connected to said third screw rod of said third stepping motor through said third threaded bearing so that said third lens holder moves back and forth (up and down) when said third stepping motor is rotating after receiving the data-signals of zooming of the zoom lens which is pre-programmed and written in the micro controller unit of the digital still camera.

12. A control system of zoom lens for a digital still camera as claimed in claim 7, wherein after said second lens housing has been rotated outward from the optical axis and path around on said axle, both the first step section of said foldable outer lens barrel with 3 folding steps, in which said first lens holder is fixed, and the second step section of said foldable outer lens barrel can be folded and retracted into the space which was provided inside the third step section of said foldable outer lens barrel by the rotation of said second lens housing.

* * * * *